United States Patent
Pappu et al.

(10) Patent No.: US 10,739,836 B2
(45) Date of Patent: Aug. 11, 2020

(54) SYSTEM, APPARATUS AND METHOD FOR HANDSHAKING PROTOCOL FOR LOW POWER STATE TRANSITIONS

(71) Applicant: Intel Corporation, Santa Clara, CA (US)

(72) Inventors: Lakshminarayana Pappu, Folsom, CA (US); Robert Milstrey, Folsom, CA (US); Amit Kumar Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 207 days.

(21) Appl. No.: 15/936,595

(22) Filed: Mar. 27, 2018

(65) Prior Publication Data

US 2019/0041959 A1 Feb. 7, 2019

(51) Int. Cl.
| | |
|---|---|
| *G06F 1/00* | (2006.01) |
| *G06F 1/3234* | (2019.01) |
| *G06F 13/16* | (2006.01) |
| *G06F 13/42* | (2006.01) |
| *G06F 13/40* | (2006.01) |
| *G06F 1/3206* | (2019.01) |
| *G06F 1/3287* | (2019.01) |

(52) U.S. Cl.
CPC .......... *G06F 1/3234* (2013.01); *G06F 1/3206* (2013.01); *G06F 1/3287* (2013.01); *G06F 13/1673* (2013.01); *G06F 13/4068* (2013.01); *G06F 13/42* (2013.01); *G06F 2213/0064* (2013.01)

(58) Field of Classification Search
CPC .... G06F 1/3234; G06F 1/3206; G06F 1/3287; G06F 13/1673; G06F 13/42; G06F 13/4068; G06F 2213/0064
See application file for complete search history.

(56) References Cited

U.S. PATENT DOCUMENTS

| | | | |
|---|---|---|---|
| 8,929,373 B2 | 1/2015 | Lakshmanamurthy et al. | |
| 2005/0182977 A1 | 8/2005 | Powers et al. | |
| 2012/0215993 A1 | 8/2012 | Yamashita | |
| 2013/0073878 A1* | 3/2013 | Jayasimha ............ | G06F 1/3287 713/300 |
| 2013/0083798 A1 | 4/2013 | Lakshmanamurthy et al. | |
| 2013/0290758 A1 | 10/2013 | Quick et al. | |

(Continued)

OTHER PUBLICATIONS

Intel Corporation, "Product Brief. Intel Go Autonomous Driving Solutions. Autonomous Driving Accelerated," Nov. 2016, 6 pages.

(Continued)

*Primary Examiner* — Xuxing Chen
(74) *Attorney, Agent, or Firm* — Trop, Pruner & Hu, P.C.

(57) ABSTRACT

In one embodiment, an apparatus includes: at least one processing circuit; at least one array associated with the at least one processing circuit; a power controller to manage power consumption of the apparatus; and a fabric bridge coupled to the power controller. The fabric bridge and power controller may be configured to implement a handshaking protocol to enable the fabric bridge to receive data from the at least one array via a sideband communication path and send the data to a system memory coupled to the apparatus via a primary communication path, prior to entry of the apparatus into a first low power state. Other embodiments are described and claimed.

20 Claims, 8 Drawing Sheets

(56) References Cited

U.S. PATENT DOCUMENTS

| | | |
|---|---|---|
| 2014/0059371 A1 | 2/2014 | Kitchin et al. |
| 2014/0181553 A1* | 6/2014 | Eckert .................. G06F 1/3234 713/323 |
| 2015/0089110 A1 | 3/2015 | Harriman et al. |
| 2015/0092779 A1 | 4/2015 | Lakshmanamurthy et al. |
| 2016/0224090 A1 | 8/2016 | Gendler et al. |
| 2017/0184666 A1 | 6/2017 | Pappu et al. |

OTHER PUBLICATIONS

Infineon, "Highly Integrated and Performance Optimized 32-bit Microcontrollers for Automotive and Industrial Applications," Mar. 2017, 62 pages.

U.S. Appl. No. 15/718,178, filed Sep. 28, 2017, entitled "System, Apparatus and Method for Tunneling Validated Security Information," by Ruirui Huang, et al.

U.S. Appl. No. 15/391,984, filed Dec. 28, 2016, entitled "Method, Apparatus and System for Handling Non-Posted Memory Write Transactions in a Fabric," by Robert P. Adler, et al.

U.S. Appl. No. 15/338,639, filed Oct. 31, 2016, entitled "Method, Apparatus and System for Automatically Performing End-To-End Channel Mapping for an Interconnect," by Krishnan Srinivasan, et al.

U.S. Appl. No. 15/801,443, filed Nov. 2, 2017, entitled "System, Apparatus and Method for Functional Testing of One or More Fabrics of a Processor," by Lakshminarayana Pappu, et al.

U.S. Appl. No. 15/801,454, filed Nov. 2, 2017, entitled "System, Apparatus and Method for Inter-Die Functional Testing of an Integrated Circuit," by Lakshminarayana Pappu, et al.

U.S. Appl. No. 15/915,476, filed Mar. 8, 2018, entitled "System, Apparatus and Method for Providing a Fabric for an Accelerator," by Lakshminarayana Pappu, et al.

International Searching Authority, "Notification of Transmittal of the International Search Report and the Written Opinion of the International Searching Authority," dated Jun. 12, 2019, in International application No. PCT/US2019/019932.

\* cited by examiner

SYSTEM, APPARATUS AND METHOD FOR HANDSHAKING PROTOCOL FOR LOW POWER STATE TRANSITIONS

TECHNICAL FIELD

Embodiments relate to power management of a system, and more particularly to power management of an integrated circuit.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated.

One manner of reducing power consumption in an integrated circuit is to cause some or all of the integrated circuit to be placed into a given one of multiple available low power states. However, there is a latency and performance penalty associated with entry into and exit from a low power state, which can have adverse impacts. For example, information present in the integrated circuit may be lost during the low power state, such that undesired overhead is incurred when the integrated circuit exits the low power state.

DETAILED DESCRIPTION

In various embodiments, an integrated circuit such as a multicore processor or other system on chip (SoC) is provided with components that interact according to a handshaking protocol to enable efficient save and restore of substantially all of the integrated circuit's context across deep low power states. By way of this handshaking protocol, which is used to communicate between a power controller of the integrated circuit and bridge circuitry of the integrated circuit via a sideband communication network, an efficient data transfer mechanism is set up. Thereafter large amounts of data can be communicated through the bridge circuit and via a primary communication network of the integrated circuit to an associated system storage, such as a system memory external to the integrated circuit. By way of this arrangement, much greater amounts of data and other information present in the integrated circuit can be saved to system memory before entry into the low power state. And in turn, this information may efficiently be restored to the integrated circuit upon exit from the low power state. Such techniques may leverage a greater latency capability available for the deep low power state when an operating system or other scheduling entity identifies environmental conditions or other triggers that indicate availability of higher latency tolerances that allow these substantial context state store and restore operations to occur.

Figure 1:
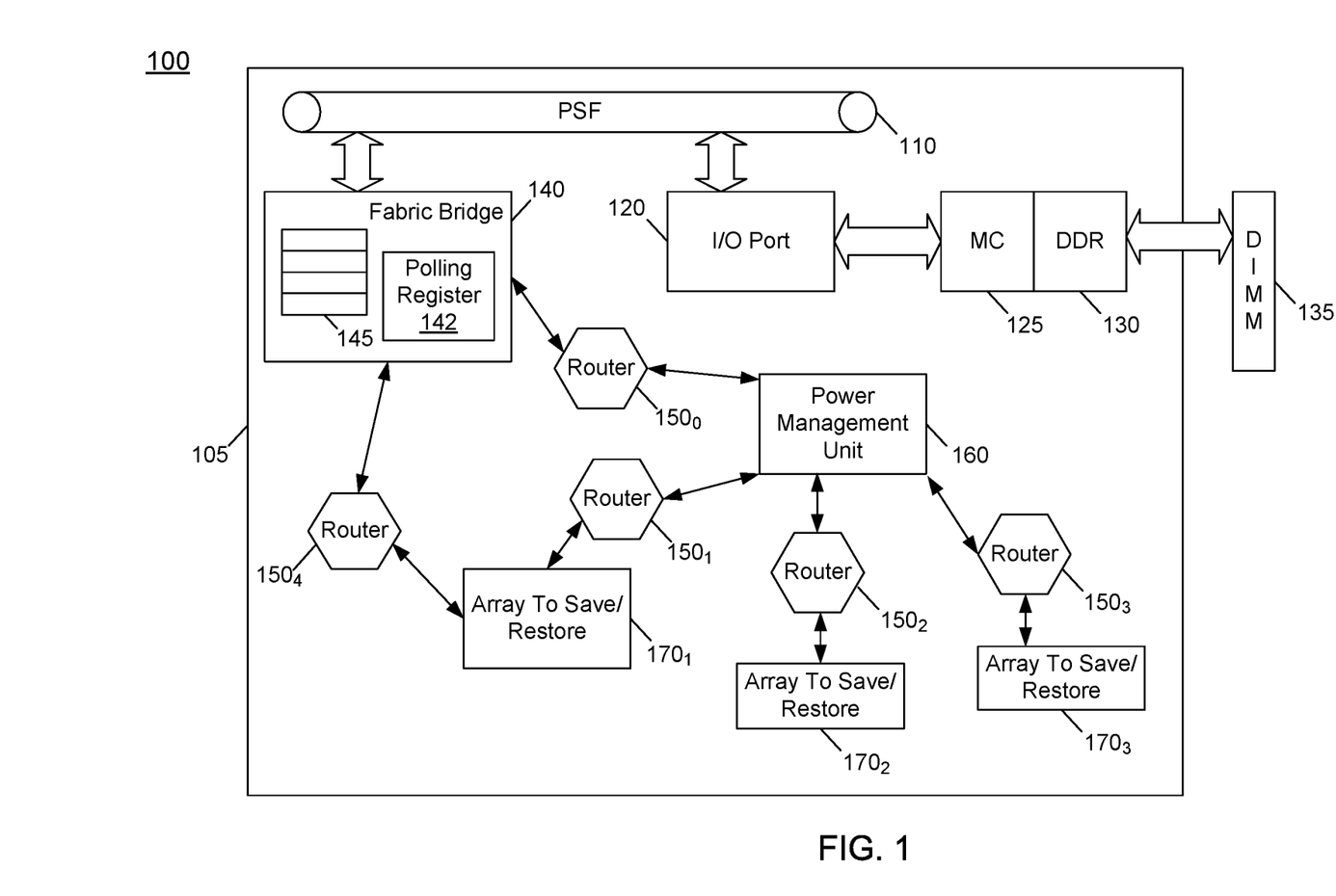
FIG. 1 is a block diagram of a system in accordance with an embodiment of the present invention.

Referring now to FIG. 1, shown is a block diagram of a system in accordance with an embodiment of the present invention. More specifically as shown in FIG. 1, a computing system 100 includes at least an integrated circuit 105 and a system memory 135. Of course depending upon the particular computing system, many more components may be present. Such system may range from a small portable device such as a smartphone, laptop computer, tablet computer and so forth to a larger system such as a personal computer, server computer and so forth.

In an embodiment, IC 105 may be implemented as a multicore processor or other system on chip (SoC). In relevant aspect here, IC 105 includes an architectural arrangement to enable efficient save and restore operations to proceed between IC 105 and system memory 135. That is, for particular relatively deep low power states, substantial portions of information present within IC 105 may be sent for storage in system memory 135. Although the scope of the present invention is not limited in this regard, information to be saved and restored may include cached information such as present in cache arrays, e.g., associated with intellectual property (IP) agents, security information such as keys or other cryptographic information, fuse information, context information and so forth. By way of storage of greater amounts of information, reduced latencies and better performance when exiting a given low power state are realized. Note further in this regard that in conventional systems, only a very limited amount of information is saved prior to entry into a given low power state. As such, in conventional systems much context information, including cached information, security keys, fuse information and so forth (all of which can be saved in embodiments) is lost when exiting the low power state, incurring longer latencies to exit and poorer performance when exiting.

To effect save and restore operations, IC 105 may include a power management unit (PMU) 160, which may include hardware, software and/or firmware to perform power management operations with regard to IC 105. In various embodiments, PMU 160 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

Integrated circuits described herein may leverage power management techniques that may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core or other processing unit is active, it runs at a C0 state, and when it is idle it may be placed in a low power state, also called a non-zero C-state (e.g., C1-C10 states), with each C-state being at a lower power consumption level (such that C10 is a deeper low power state than C1, and so forth).

Understand that many different types of power management techniques may be used individually or in combination in different embodiments. As representative examples, a power controller may control the integrated circuit to be power managed by some form of dynamic voltage frequency scaling (DVFS) in which an operating voltage and/or operating frequency of one or more cores or other logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Although the scope of the present invention is not limited in this regard, embodiments may be used to save information from IC 105 to memory 135 prior to entry into particular deep low power states such as a C10 state. In a C10 state, nearly all the power is removed from IC 105, including for storages of on-die restore context, and thus all context is lost. In this mode, all the power in fuse blocks, save/restore memories and voltage regulators are powered off, saving power and enabling a low total package power level. In some cases, this C10 or other deep sleep state may be entered when a given system in which IC 105 is included is to enter into particular system low power states such as an S0i3 system low power state.

As will be described further herein, embodiments implement a handshaking protocol between PMU 160 and a fabric bridge 140 via a sideband communication system. Fabric bridge 140 is configured to interact with PMU 160 and memory controller 125 (and DIMM 135). With this handshaking protocol, for a save operation, fabric bridge 140 may send data to be saved via a primary communication system for storage in system memory 135. And in the reverse direction for restore operations, such data may, again pursuant to the handshaking protocol, be read by fabric bridge 140 via the primary communication system and then sent via the sideband communication system to its destination.

Note that various commands may be used in the handshaking protocol to provide control information from the PMU to the fabric bridge. As examples, such commands may include various read, write, poll and inject commands, among others. In a particular embodiment, one handshaking protocol transaction may be a no operation command (NOP) sent by PMU 160 to fabric bridge 140 when no transaction is in flight, to indicate that PMU 160 is idling. A WRITE_DATA and/or READ_DATA command sent from the PMU may, via the sideband communication path, provide information including: write address; data; destination ID; security attributes of initiator (SAI); transaction type; transaction format; snoop attributes; byte enables; and root space fields. A GO or inject command causes the fabric bridge to issue a given transaction onto the primary fabric. A poll command, may for a non-posted transaction (during the restore), be used to poll to determine whether data is present in the fabric bridge for the completion of the transaction. Since the latency of the response varies from die-to-die and product-to-product, a constant delay may not be present.

As illustrated in FIG. 1, PMU 160 couples to fabric bridge 140 via a sideband router $150_0$ to provide a sideband communication path between PMU 160 and fabric bridge 140. In turn, PMU 160 further couples via additional sideband routers $150_1$-$150_3$ to relevant arrays $170_1$-$170_3$, which may store information to be saved and restored. Arrays 170 may be cache memories associated with particular IP agents, or may be other storages such as registers, fuse storages, security storages, or so forth that store information desired to be saved and restored across a low power state event.

While one embodiment described herein performs a handshaking protocol in which PMU 160 is a master device and fabric bridge 140 acts as a slave, embodiments are not so limited. That is, in other cases fabric bridge 140 itself may act as a master device to perform save and restore operations with regard to array-based information via coupling of fabric bridge 140 to such arrays. For illustrative purposes, a sideband router $150_4$ couples fabric bridge 140 to array $170_1$ to provide a sideband communication path between fabric bridge 140 and array $170_1$. Understand that similar sideband connection may be made between fabric bridge 140 and other arrays. Also understand that sideband routers 150 are shown with limited connections for ease of illustration. In embodiments, a given IC may include additional (i.e., more than two) agents coupled to a given sideband router.

To enable efficient handshake operations, fabric bridge 140 may include a buffer 145, which in an embodiment may be implemented as a first-in first-out (FIFO) buffer 145 or other queuing mechanism to perform direct memory access (DMA)-type operations. Note that FIFO buffer 145 within fabric bridge 140 may enhance latency reductions, by reducing the idling time of PMU 160 and further improving data rate. As further illustrated, fabric bridge 140 also includes at least one polling register 142 (or other status register), details of which are described further below. Note that in embodiments, a fabric bridge may be implemented as a custom device, rather than an industry standard device such as a PCIe device, avoiding elaborate hardware/software configuration. Nevertheless, embodiments may also apply to industry standard interfaces, such as a PCIe device, AMBA/AXI bridge and other available system interfaces.

Note that fabric bridge 140 and power management unit 160 may be implemented in one or more always on domains of IC 105. As such, these domains may be provided with power (e.g., a given operating voltage) and clock signals to enable these two components to be the last components to enter into a low power state and the first components to be powered on following such low power state. More specifically, IC 150 may be configured such that PMU 160 is the last component to enter into a low power state and the first component to exit a low power state. Fabric bridge 140 is the penultimate component to enter into a low power state and the second component to exit a low power state.

Still with reference to FIG. 1, fabric bridge 140 couples to a primary scalable fabric (PSF) 110. In an embodiment, PSF 110 may be implemented as an integrated on-chip scalable fabric (IOSF) which may be designed according to a given specification of a semiconductor manufacturer to provide a standardized on-die interconnect protocol for attaching components within a chip, such as intellectual property (IP) blocks. In turn, fabric 110 couples via an input/output (I/O) port 120 to a memory controller 125, which may be an integrated memory controller to control communications with a memory 135. In turn, memory controller 125 couples to a memory interface, e.g., implemented as a double data rate (DDR) interface 130. IC 105 couples to system memory 135 via a given memory interconnect. System memory 135 may be implemented as a dynamic random access memory (DRAM), e.g., implemented as dual inline memory modules (DIMMs).

While FIG. 1 shows an embodiment in which all components other than memory 135 are implemented in a single integrated circuit (and in embodiments in which all may be implemented on a single semiconductor die), embodiments are not so limited. For example, in other cases an integrated circuit may take the form of a multi-chip module. Yet in other cases, multiple discrete components may couple together within a computing platform that incorporate embodiments as described herein. For example, embodiments of the handshaking protocol described herein may be applicable to client peripheral controller hub (PCH), micro server and other products. And similar techniques can be deployed between SoCs and the bridges or platform power components at a platform level. As such, embodiments may be used in wide range of applications to any SoC as well as to power saving multi-die applications at platform system level. Further understand while only limited amounts of components are shown in the IC implementation of FIG. 1, a given IC of course includes additional circuitry. For example, with regard to FIG. 1, note that each of arrays 170 may be associated with a given IP agent such as a processing core, accelerator, specialized processing circuit or so forth. And in some cases, arrays 170 themselves may be included within such agents. For example, array $170_1$ may be a cache memory of a first processor core of IC 105.

Figure 2:
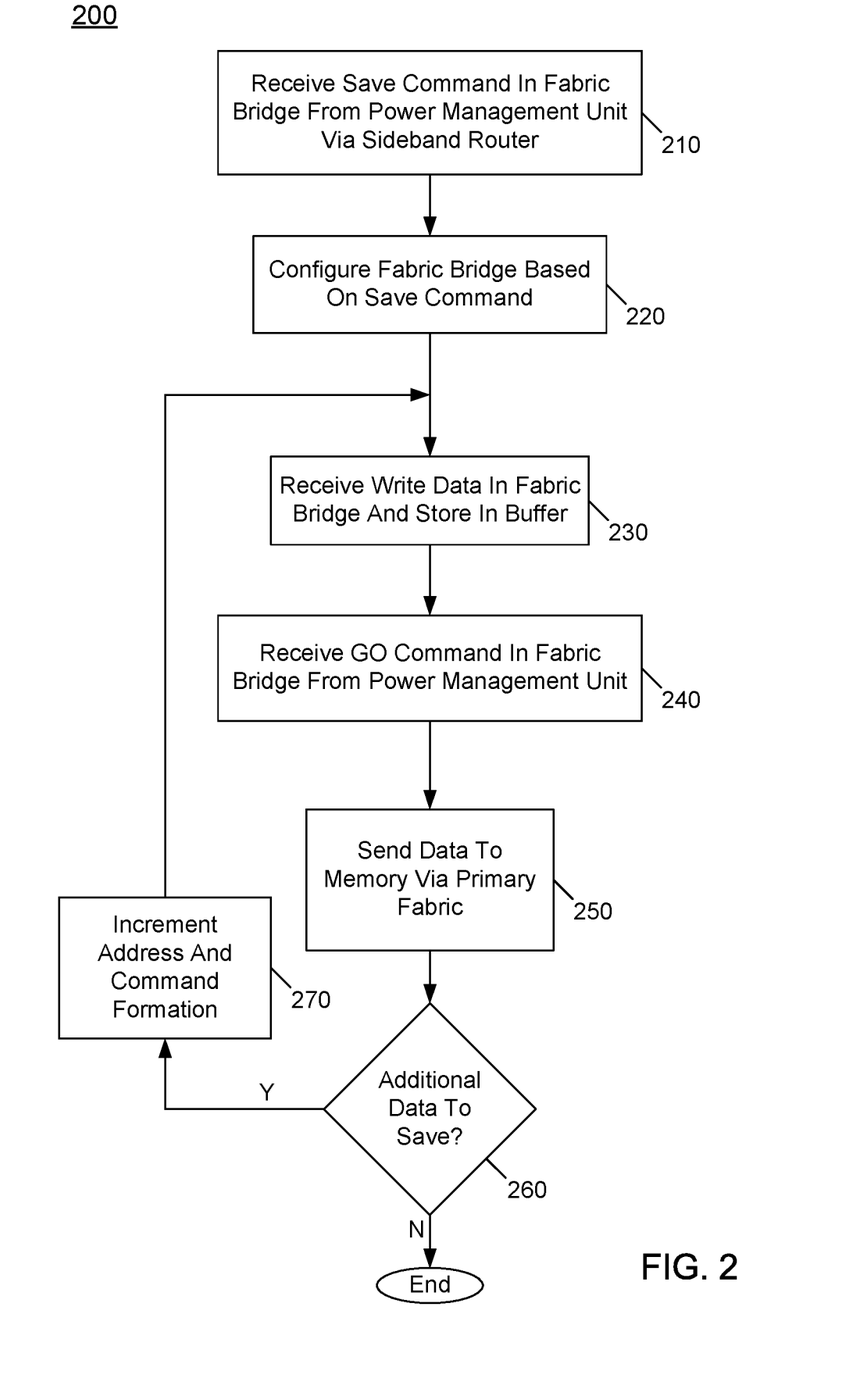
FIG. 2 is a flow diagram of a method in accordance with an embodiment of the present invention.

Referring now to FIG. 2, shown is a flow diagram of a method in accordance with an embodiment of the present invention. More specifically, FIG. 2 shows a method 200 for performing a save operation using handshaking between a fabric bridge and a power management unit as described herein. As such, method 200 can be performed by hardware circuitry, firmware, software and/or combinations thereof. In general, method 200 is used to initiate handshaking between PMU and fabric bridge, and then to enable interactive saving of given data received in the fabric bridge via a sideband mechanism and thereafter from the fabric bridge to memory via a primary fabric. Such operation may be initiated by a PMU in response to identification of availability to enter a given low power state. In one example, an operating system (OS) or other supervisor may identify a possibility for entry into deep low power state based on a system context. For example, the OS may identify a trigger event that makes entry into the deep low power state suitable, such as a display off or lid down scenario, where the OS is predicting a long idle latency and has relaxed requirements for wake latency. To this end, the OS may send a message to the PMU to update latency information. In a particular embodiment, the OS may send a latency tolerance value to cause the PMU to update latency information in a configuration register.

As a particular example, assume that the OS sends a message to the PMU to indicate that there is now a given (e.g., 30 milliseconds (ms)) latency tolerance to wake up. With this information, the PMU may update a latency tolerance field of a configuration register. In turn, based on this update, the PMU may trigger entry of the IC into a deep low power state. The PMU (e.g., via its internal firmware) may have the knowledge of all context to be saved. The fabric bridge, which is a primary agent, establishes a path via a memory controller, to system memory. The PMU, via a handshake mechanism between it and fabric bridge, enables transfer of all data (identified by the PMU to be saved) to be sent to memory. After this save operation is completed, the PMU configures the fabric bridge to enter into a given sleep mode.

As illustrated, method 200 begins by receiving a save command in the fabric bridge from the PMU (block 210). Such command may be received via the sideband router. More specifically, this save command may be implemented in the form of a configuration message that includes various configuration information and a command that includes a starting address to identify a location of a starting address in system memory at which a data block is to be saved. Next, control passes to block 220 where the fabric bridge may be configured based on this save command. For example, the fabric bridge may be configured with this information, including address information and so forth. Next control passes to block 230 where write data is received in the fabric bridge and stored in a buffer. More specifically, the PMU may issue a write data command with a given unit of data, e.g., 32 bits of data. Such command may be received from the PMU. Upon receipt of this data, the fabric bridge may store the data in a given one of its multiple buffers, e.g., in FIFO order.

Next, control passes to block 240 where a GO command is received in the fabric bridge from the PMU. More specifically this GO command is an inject command that is the handshake instruction from the PMU to cause the fabric bridge to inject the data along a primary communication path to memory. As such, control passes to block 250 where the fabric bridge sends the data to memory via the primary fabric. For example, with reference back to FIG. 1, fabric bridge 140 communicates this data chunk via primary scalable fabric 110, I/O port 120 and through memory controller 125 and interface 130 to enable its storage within system memory 135.

Still with reference to FIG. 2, next it is determined at diamond 260 whether there is additional data to be saved. This determination may be based at least in part on receipt of additional sideband communications with the PMU. If additional data is to be saved, control passes to block 270 where the address may be incremented (e.g., according to an auto increment operation) and command formation also may be performed. Thereafter, control passes back to block 230 for receipt of additional write data. Understand while shown at this high level in the embodiment of FIG. 2, many variations and alternatives are possible.

Figure 3:
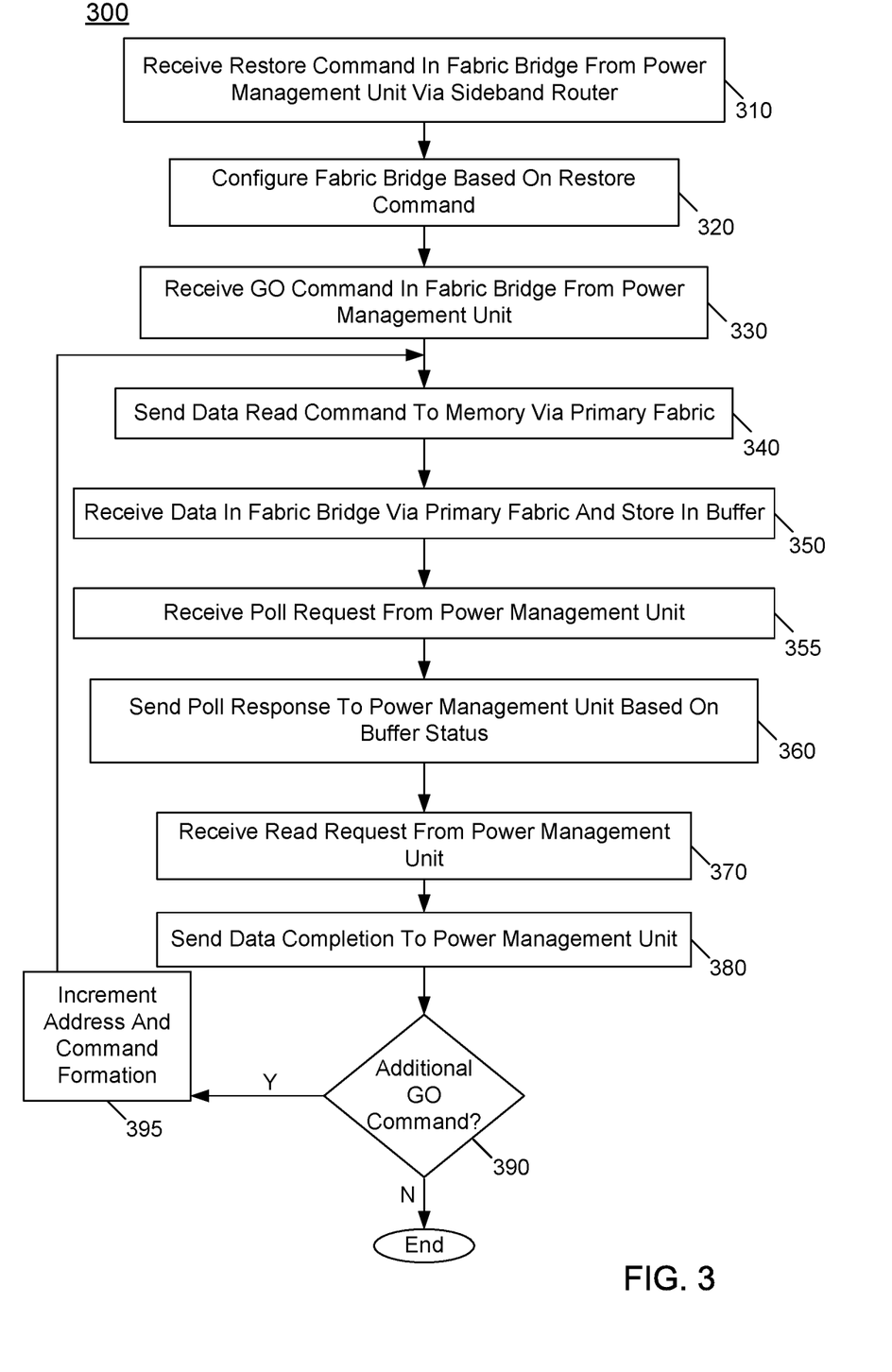
FIG. 3 is a flow diagram of a method in accordance with another embodiment of the present invention.

Referring now to FIG. 3, shown is a flow diagram of a method in accordance with another embodiment of the present invention. More specifically, FIG. 3 shows a method 300 for performing a restore operation using handshaking between a fabric bridge and a power management unit as described herein. As such, method 300 can be performed by hardware circuitry, firmware, software and/or combinations thereof. In general, method 300 is used to initiate handshaking between PMU and fabric bridge, and then to enable interactive restoring of given data from memory via a primary fabric, and thereafter from the fabric bridge to the PMU via a sideband mechanism. Note that the exit sequence from a deep low power state is similar to that of a cold reset of a processor. The PMU brings up power to the fabric bridge and other minimal set of components involved in a restore operation including the memory controller and memory interface. A handshake between PMU and fabric bridge may be used to restore all data from the memory.

As illustrated, method 300 begins by receiving a restore command in the fabric bridge from the PMU (block 310). Such command may be received via the sideband router as a configuration message that includes various configuration information and a command that includes a starting address to identify a location of a starting address in system memory at which a data block is to be restored. Next, control passes to block 320 where the fabric bridge may be configured based on this restore command. For example, the fabric bridge may be configured with this information, including address information and so forth. Next control passes to block 330 where a GO command is received in the fabric bridge from the PMU. This GO command triggers the fabric bridge to send a data read command to memory via the primary fabric (block 340). Thereafter, this read data is received in the fabric bridge and stored in a buffer (block 350).

Still with reference to FIG. 3, control next passes to block 355, where a poll request is received from the PMU. This poll request seeks information regarding a status of a pending read operation, namely whether a read completion has been received. Reference for this poll request may be made to a polling or status register of the fabric bridge to determine a status of one or more read requests. Further understand that while poll request is shown at block 355 in linear fashion after block 350, such poll request may be received (and handled) asynchronously with regard to actual read requests and completions from memory.

Following the flow of method 300, control next passes to block 360 where a poll response is sent to the PMU. More specifically, this poll response may provide information, e.g., obtained from the status or poll register that indicates, e.g., presence (or not) of data in one or more completion registers (e.g., the FIFO buffer) obtained from system memory responsive to earlier read commands.

Assuming that a poll response indicates presence of requested data, the PMU may send a read request. Thus as seen in FIG. 3, control next passes to block 370 where this read request is received from the PMU. In response to this read request, at block 380 the fabric bridge may send completion data to the PMU. Further operations, including updating the poll or status register to clear the valid indication also may occur.

Still with reference to FIG. 3, next it is determined at diamond 390 whether there is additional data to be restored. This determination may be based at least in part on receipt of additional sideband communications with the PMU such as request of another GO command. If so, control passes to block 395 where the address may be incremented (e.g., according to an auto increment operation) and command formation also may be performed. Thereafter, control passes back to block 340 to send another data read command to the memory. Understand while shown at this high level in the embodiment of FIG. 3, many variations and alternatives are possible.

Figure 4:
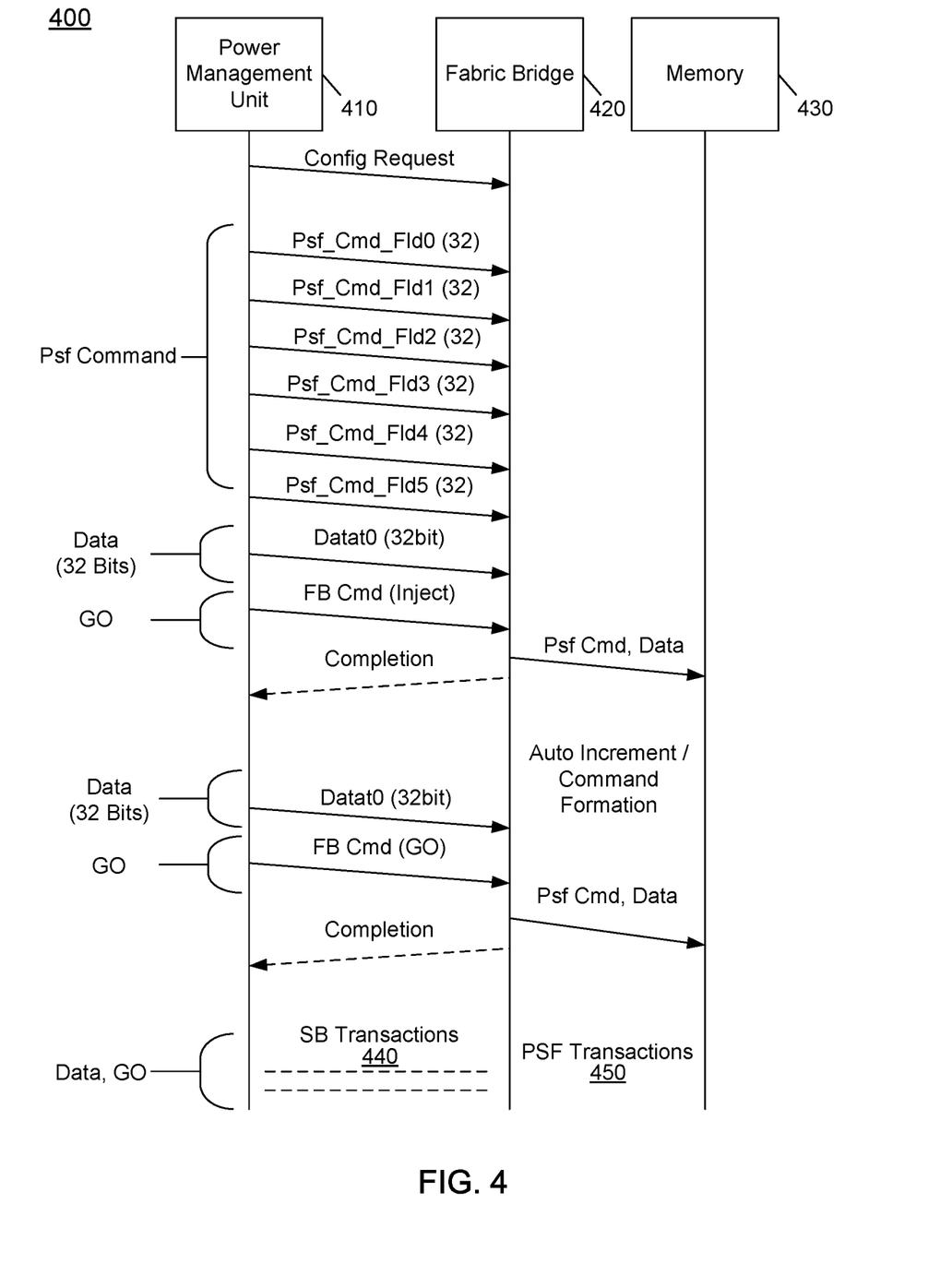
FIG. 4 is a transaction flow for save operations in accordance with an embodiment.

Referring now to FIG. 4, shown is a transaction flow for save operations in accordance with an embodiment. More specifically as shown in FIG. 4, a transaction flow 400 is illustrated for handshake operations between a PMU 410 and a fabric bridge 420. In response to these handshake operations, fabric bridge 420 in turn may save data to a memory 430. In the illustration of FIG. 4, transaction flow 400 includes transactions sent between PMU 410 and fabric bridge 420. Specifically, these transactions are generally illustrated as sideband transactions 440. Further, transactions sent from fabric bridge 420 to memory 430 are generally illustrated as primary scalable fabric transactions 450.

As shown in FIG. 4, PMU 410 issues a configuration message (Configuration Request) to fabric bridge 420. Thereafter, PMU 410 issues a command (Psf_Cmd_fld) which may include multiple flits that indicates a starting address within memory 430 for the save operation and other command information for the save operation, all of which may be stored in one or more command registers of fabric bridge 420. In an embodiment, these command messages may be in the form of one or more PSF commands, namely multiple flits each including a number of bits to provide information to populate one or more command registers such as a command attribute register of fabric bridge 420. Such information, in an embodiment, includes command type information, identification information, e.g., regarding source and destination, addressing information (which may correspond to a given address within an off-chip memory) and other information associated with the command, including various header information, formatting information and so forth. Although the particular example shown in FIG. 4 includes a command with 6 flits, understand the scope of the present invention is not limited in this regard. Relevant for purposes herein, these command flits include, at a minimum the starting address within the destination memory, to enable the save operation to occur.

Furthermore, in the embodiment shown in FIG. 4, an auto-increment implementation is used. As such, although multiple data blocks may be saved to memory during transaction flow 400 (and potentially a very large number of blocks, e.g., hundreds of blocks, with the size of each block potentially being several KB), only a single address is communicated from PMU 410 to fabric bridge 420. And further, the various command information also is sent only a single time. In an embodiment, PMU 410 has the knowledge of all blocks of data to be stored and a map of secured block saving space in memory (e.g., one or more secluded areas in DRAM space). For every save/restore operation, a starting address from where the data is to be stored and restored and a corresponding size may be provided to fabric bridge 420, e.g., as data pointers. In some cases, fabric bridge 430 is equipped with this knowledge without the need for programming from PMU 410.

To enable auto increment operation, the command messages send from PMU 410 may include an auto increment indicator, which may be of a set state to indicate that auto increment operation is to be enabled. And in response to receipt of this indicator as part of the command, fabric bridge 420 may store a set auto increment indicator in a given field of its one or more command registers. That is, with auto incrementing as performed herein, a handshake protocol formed of a single data communication and subsequent GO command may occur to efficiently send large amounts of information to memory prior to entry into a given low power state.

Still with reference to FIG. 4, after communication of this PSF command information, PMU 410 issues a first write data command (Datat0) with corresponding data to be written (e.g., 32 bits). Fabric bridge 420 stores this data in a temporary storage such as a FIFO buffer. Although the scope of the present invention is not limited in this regard, for performing a handshake operation during a save flow as in FIG. 4, this write data command is received in fabric bridge 420 and stored in a single write register reserved for purposes of these write commands from PMU 410.

In any event, following communication of the data command, PMU 410 next sends a GO command. This GO command causes fabric bridge 420 to inject this data via a primary fabric transaction sent to memory 430. More specifically, fabric bridge 420 may be configured to send a write memory transaction to the starting address stored in the command register. Understand that additional information may be included within the write memory transaction. For example, various identifier information, including source and destination identifiers, among other information may be present. In one particular embodiment, a write memory transaction also may include security information, such as security attribute information (SAI) of PMU 410, to identify the write transaction as a trusted transaction to proceed through the primary communication path. Optionally, after sending this write memory transaction, fabric bridge 420 may issue a completion back to PMU 410.

As further illustrated, so long as there is additional data for saving, these data and GO commands may be sent serially from PMU 410 to fabric bridge 420. Notably, the overhead of the command communication can be avoided by performing an auto-increment of address information. That is, after each write transaction directed via the primary fabric to memory 430, fabric bridge 420 performs an auto increment to update the address in its command register. As one such example, assuming incoming data blocks are 32 bits, each auto increment operation updates the address stored in an address field of the command register by a four byte amount. Note that in addition to auto-incrementing of starting address, a write transaction can be automatically formatted. Namely, a command format for the memory write transaction may be generated automatically within fabric bridge 420 that includes the above-described information, including destination address, source and destination identifiers, security information and so forth. As such, an auto increment and command formation operation may occur between each such packet. These communications (data and GO command from PMU 410 and write memory transaction from fabric bridge 420) may occur serially for each chunk of data, e.g., 32 bits. Note that while the embodiment shown in FIG. 4 is with regard to an auto increment mode of operation for efficiency and reduced latency, it is possible to operate in a regular mode in which address information is not incremented. In such instances, prior to communication of a data command and corresponding GO command, command information as in transaction flow 400 is sent. Understand while shown at this high level in the embodiment of FIG. 4, many variations and alternatives are possible.

Figure 5:
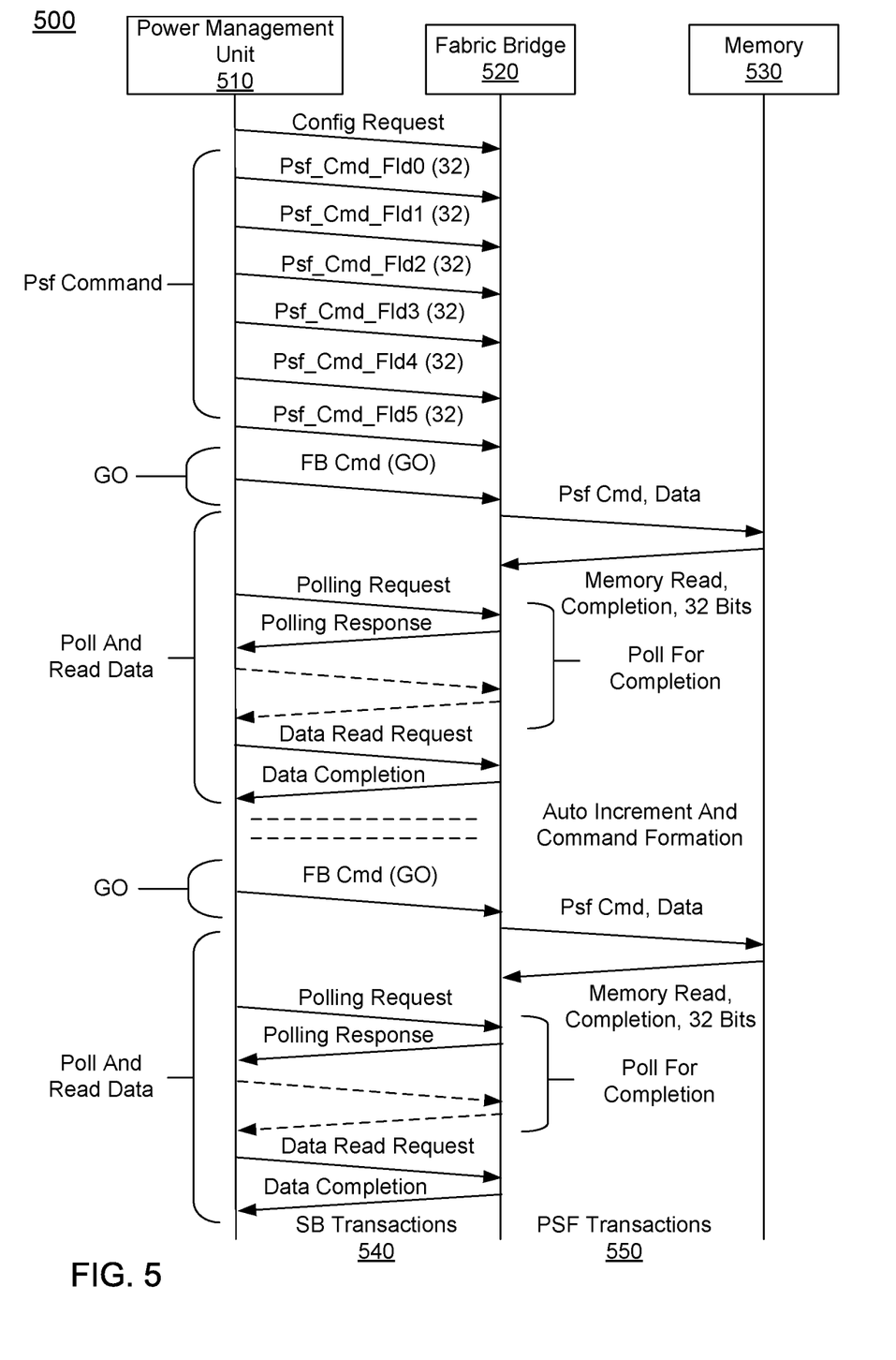
FIG. 5 is a transaction flow for restore operations in accordance with an embodiment.

Referring now to FIG. 5, shown is a transaction flow for restore operations in accordance with an embodiment. More specifically as shown in FIG. 5, a transaction flow 500 is illustrated for handshake operations between a PMU 510 and a fabric bridge 520. In response to these handshake operations, fabric bridge 520 in turn may read data from a memory 530. In the illustration of FIG. 5, transaction flow 500 includes transactions sent between PMU 510 and fabric bridge 520. Specifically, these transactions are generally illustrated as sideband transactions 540. Further, transactions sent from fabric bridge 520 to memory 530 are generally illustrated as primary scalable fabric transactions 550.

As shown in FIG. 5, PMU 510 issues a configuration message (Configuration Request) to fabric bridge 520. Thereafter, PMU 510 issues a command (Psf_Cmd_fld) which may include multiple flits that indicates a starting address within memory 530 for the restore operation and other command information for the restore operation, all of which may be stored in one or more command registers of fabric bridge 520. As with the above discussion such information, in an embodiment, includes command type information, identification information, e.g., regarding source and destination, addressing information (which may correspond to a given address within an off-chip memory) and other information associated with the command, including various header information, formatting information and so forth. Relevant for purposes herein, these command flits include, at a minimum the starting address within the source memory, to enable the restore operation to occur.

Furthermore, in the embodiment shown in FIG. 5, an auto-increment implementation is used. As such, although multiple data blocks may be read from memory during transaction flow 500, only a single address is communicated from PMU 510 to fabric bridge 520, along with a single sending of various command information. The command messages send from PMU 510 may include an auto increment indicator which may be of a set state to indicate that auto increment operation is to be enabled. And in response to receipt of this indicator as part of the command, fabric bridge 520 may store a set auto increment indicator in a given field of its one or more command registers.

Still with reference to FIG. 5, after communication of this PSF command information, PMU 510 issues a first GO command, which causes fabric bridge 520 to send a memory read request to memory 530, which in turn sends a read completion with the requested data.

Note that polling operations may proceed between PMU 510 and fabric bridge 520, namely a polling request from PMU 510 to trigger a polling response from fabric bridge 520. Such requests and responses may iteratively occur until the requested data is stored within fabric bridge 520.

At this point, in response to a valid indication as to the presence of data within fabric bridge 520, PMU 510 sends a data read request that triggers a data completion sent from fabric bridge 520 to PMU 510. This flow with GO command, read request to memory, resulting data return and polling until data is received may proceed iteratively as under control of PMU 510. As with the above discussion, this iterative process may occur by way of auto address increment and command formation. Understand while shown at this high level in the embodiment of FIG. 5, many variations and alternatives are possible.

Using an embodiment as described herein, an architecture in which a PMU is maintained within a sideband network is realized. With this arrangement, the expense and overhead (including customization) for providing a primary interface for a PMU can be avoided. Also with a handshaking protocol as described herein, a fabric bridge and PMU may be in synchronization. By way of a FIFO, buffer interaction wait times between a PMU and fabric bridge may be reduced. That is since fabric speeds (primary and secondary) and throughput to memory vary, this buffer mechanism may improve overall bandwidth for deep low power state exit and entry operations.

Figure 6:
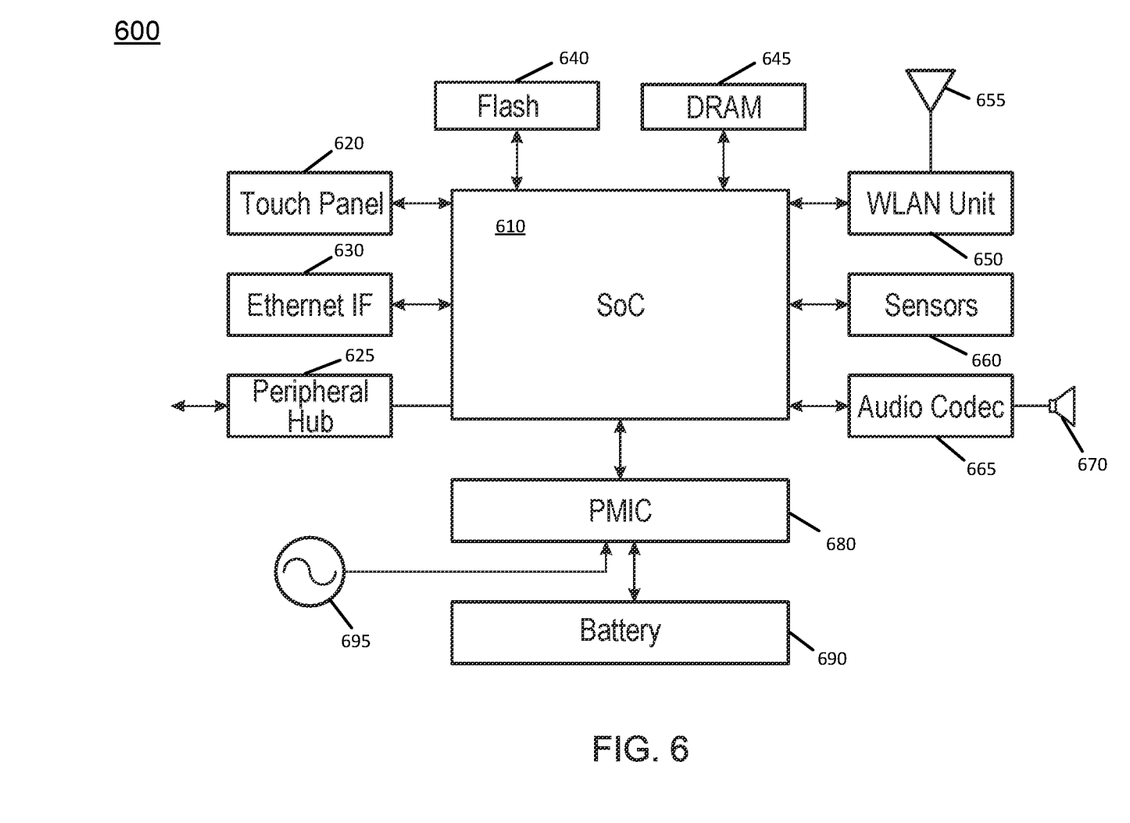
FIG. 6 is a block diagram of an example system with which embodiments may be used.

Embodiments as described herein may be implemented in a wide variety of system types, ranging from small portable devices to larger more compute complex devices. Referring now to FIG. 6, shown is a block diagram of an example system with which embodiments may be used. In the illustration of FIG. 6, system 600 may be a mobile system such as a tablet computer, 2:1 tablet, phablet, in-vehicle system, or other system. As illustrated, a SoC 610 is present and may be configured to operate as an application processor for the device. SoC 610 may include a power management unit and a fabric bridge that implement a handshaking protocol to enable substantial amounts of context state to be saved and restored across deep low power states, as described herein.

A variety of devices may couple to SoC 610. In the illustration shown, a memory subsystem includes a flash memory 640 and a DRAM 645 coupled to SoC 610. In embodiments, DRAM 645 may include one or more secluded storage areas for storage of this context state during particular deep low power states. Note in this regard that DRAM 645 may be at least placed into a self-refresh state during these low power opportunities to maintain the context. In addition, a touch panel 620 is coupled to the SoC 610 to provide display capability and user input via touch, including provision of a virtual keyboard on a display of touch panel 620. To provide wired network connectivity, SoC 610 couples to an Ethernet interface 630. A peripheral hub 625 is coupled to SoC 610 to enable interfacing with various peripheral devices, such as may be coupled to system 600 by any of various ports or other connectors.

In addition to internal power management circuitry and functionality within SoC 610, a PMIC 680 is coupled to SoC 610 to provide platform-based power management, e.g., based on whether the system is powered by a battery 690 or AC power via an AC adapter 695. In addition to this power source-based power management, PMIC 680 may further perform platform power management activities based on environmental and usage conditions. Still further, PMIC 680 may communicate control and status information to SoC 610 to cause various power management actions within SoC 610.

Still referring to FIG. 6, to provide for wireless capabilities, a WLAN unit 650 is coupled to SoC 610 and in turn to an antenna 655. In various implementations, WLAN unit 650 may provide for communication according to one or more wireless protocols. As further illustrated, a plurality of sensors 660 may couple to SoC 610. These sensors may include various accelerometer, environmental and other sensors, including user gesture sensors. Finally, an audio codec 665 is coupled to SoC 610 to provide an interface to an audio output device 670. Of course understand that while shown with this particular implementation in FIG. 6, many variations and alternatives are possible.

Figure 7:
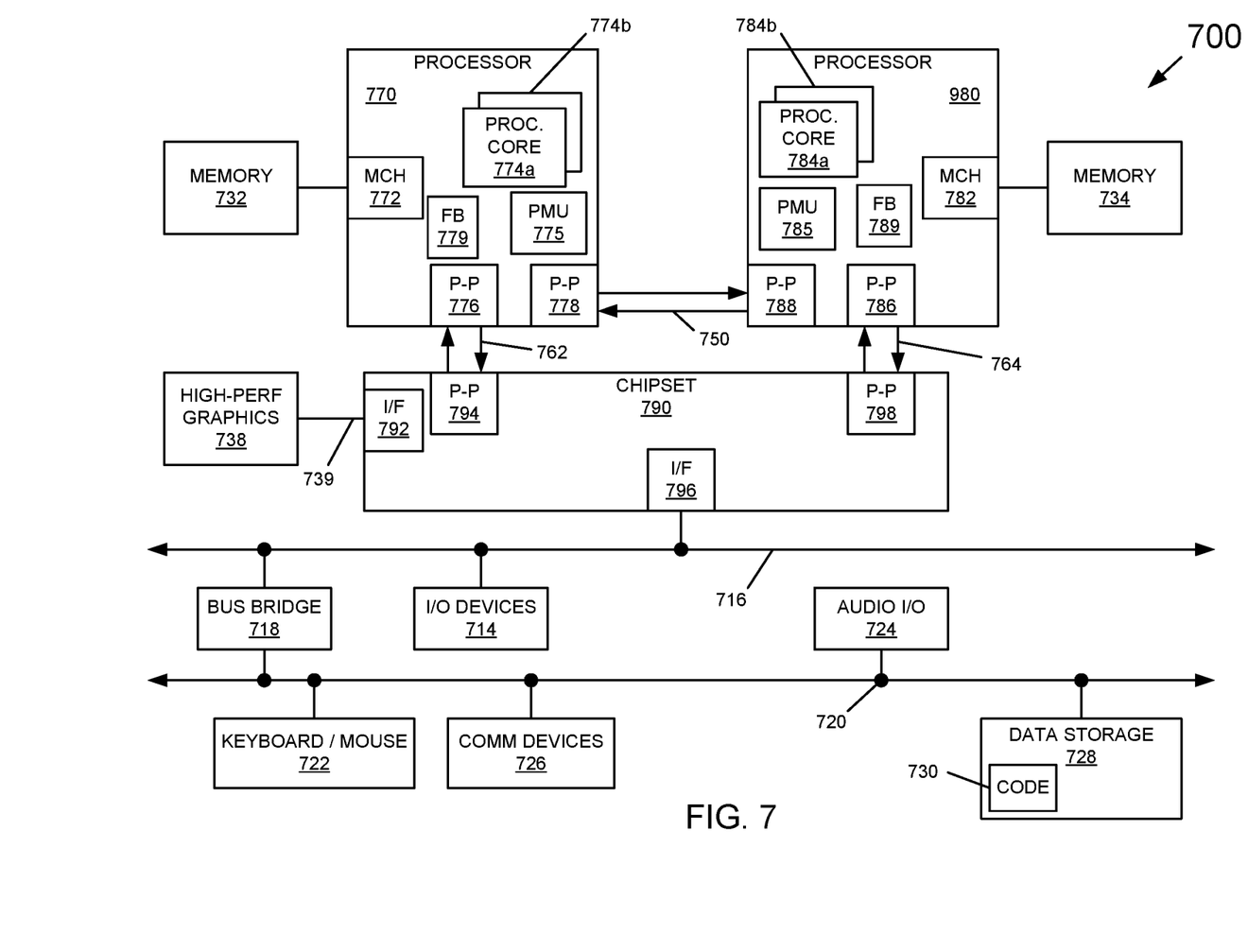
FIG. 7 is a block diagram of a system in accordance with an embodiment of the present invention.

Referring now to FIG. 7, shown is a block diagram of a system in accordance with an embodiment of the present invention. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors. Processors 770, 780 further may include corresponding PMUs 775, 785 and corresponding fabric bridges 779, 789, which may perform handshaking protocols as described herein to enable save and restore operations to occur.

Still referring to FIG. 7, first processor 770 further includes a memory controller hub (MCH) 772 and point-to-point (P-P) interfaces 776 and 778. Similarly, second processor 780 includes a MCH 782 and P-P interfaces 786 and 788. As shown in FIG. 7, MCH's 772 and 782 couple the processors to respective memories, namely a memory 732 and a memory 734, which may be portions of system memory (e.g., DRAM) locally attached to the respective processors. Memories 732, 734 each may include secluded areas for storage of context state across low power events as described herein. First processor 770 and second processor 780 may be coupled to a chipset 790 via P-P interconnects 762 and 764, respectively. As shown in FIG. 7, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 7, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, Ultrabook™, or so forth.

Figure 8:
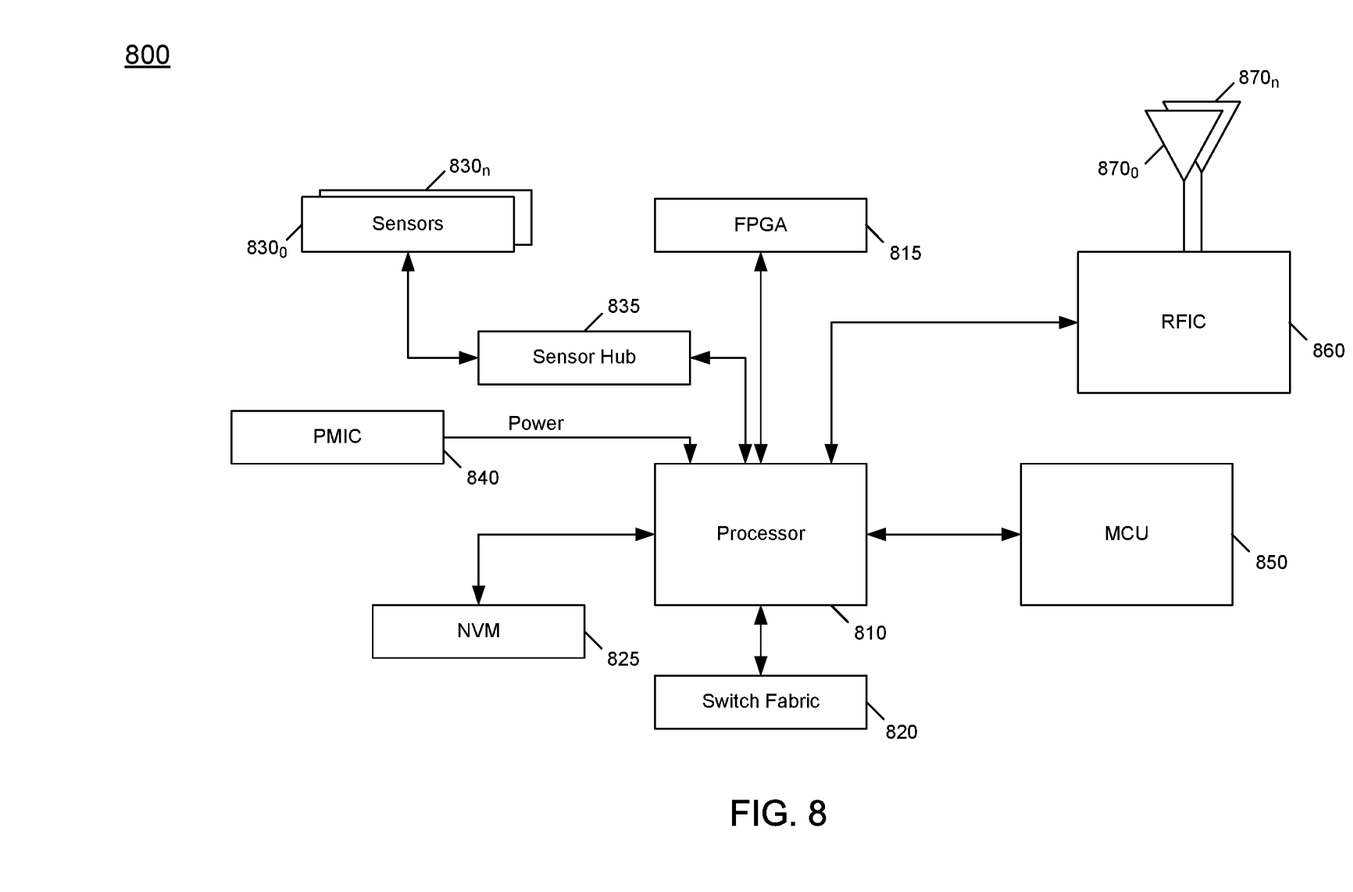
FIG. 8 is a block diagram of a system in accordance with another embodiment of the present invention.

Referring now to FIG. 8, shown is a block diagram of a system in accordance with another embodiment of the present invention. In the embodiment of FIG. 8, system 800 is an autonomous driving computing system. As such, system 800 may be implemented within a vehicle that provides for some level of autonomous driving. Understand that with different levels of autonomous driving control, different levels of workloads may be executed within system 800 to autonomously perform some or all driving tasks autonomously.

As illustrated, system 800 includes a processor 810, which may be a general-purpose multicore processor or other SoC. Processor 810 may include a PMU and a fabric bridge to perform a handshaking protocol as described herein for use in save and restore operations across deep low power state events. In different implementations, multiple such processors may be implemented to flexibly allocate autonomous driving workloads across these processors. Processor 810 receives power that is controlled by a power management integrated circuit (PMIC) 840.

System 800 may further include one or more field programmable gate arrays (FPGAs) 815 or other programmable accelerators to which certain autonomous driving workloads may be offloaded. Processor 810 further couples to a non-volatile memory 825, which in an embodiment may be implemented as a flash memory. To provide communication with other components within a vehicle, processor 810 further couples to a switch fabric 820 which in an embodiment may be implemented as an Ethernet switch fabric that in turn may couple to other components within a vehicle, including display components, vehicle infotainment systems, and so forth. Still further, processor 810 (and switch fabric 820) also couples to a microcontroller 850.

Furthermore, to enable interaction with other systems, including other vehicles, roadway systems, over-the-air update sources, infotainment content sources, sensor data communication and so forth, processor 810 and MCU 850 may couple to one or more radio frequency integrated circuits (RFICs) 860. In embodiments, RFIC 860 may be configured to support 5G-based specifications for communication of automotive and other data via a variety of wireless networks. To this end, RFIC 860 may couple to one or more antennas 870$_0$-870$_n$ of a vehicle.

As further illustrated in FIG. 8, system 800 may include a plurality of sensors 830$_0$-830$_n$ that provide sensor information, via a sensor hub 835 to processor 810. Although the scope of the present invention is not limited in this regard in embodiments, such sensors may include lidar, ultrasound, radar and optical sensors, among other sensor types. Such sensors may obtain large amounts of sensor data while the vehicle is in operation. Sensor hub 835 may be configured to fuse at least some of this data to provide information regarding the vehicle's surroundings, for provision to processor 810. In turn, processor 810 and/or FPGA 815 may use this fused sensor information in connection with performing autonomous driving workloads. Understand while shown at this high level in the embodiment of FIG. 8, many variations and alternatives are possible.

The following examples pertain to further embodiments.

In one example, an apparatus includes: at least one processing circuit; at least one array associated with the at least one processing circuit; a power controller to manage power consumption of the apparatus; and a fabric bridge coupled to the power controller. The fabric bridge and power controller may be configured to implement a handshaking protocol to enable the fabric bridge to receive data from the at least one array via a sideband communication path and send the data to a system memory coupled to the apparatus via a primary communication path, prior to entry of the apparatus into a first low power state.

In an example, the sideband communication path comprises a first sideband router to couple the power controller and the fabric bridge.

In an example, the primary communication path comprises a primary fabric to couple the fabric bridge to the system memory via a memory controller.

In an example, the power controller comprises a master to initiate the handshaking protocol prior to entry of the apparatus into the first low power state, where in the first low power state the apparatus does not retain context.

In an example, the power controller is to: send a configuration request to the fabric bridge to prepare the fabric bridge for entry into the first low power state; send at least one command to the fabric bridge including address information to instruct the fabric bridge to send a first data block to the system memory; send the first data block from the at least one array to the fabric bridge; and send an inject command to the fabric bridge to cause the fabric bridge to send the first data block via the primary communication path to a first location in the system memory corresponding to the address information.

In an example, in response to exit of the apparatus from the first low power state, the power controller is to: send a second configuration request to the fabric bridge to configure the fabric bridge for the exit from the first low power state; send at least one second command to the fabric bridge including second address information to cause the fabric bridge to read a second data block from a second location in the system memory corresponding to the second address information; send a polling request to the fabric bridge to determine whether the fabric bridge has obtained the second data block; receive a polling response from the fabric bridge; and in response to a ready indication of the polling response that indicates that the fabric bridge has obtained the second data block, send a read request to the fabric bridge to receive the second data block from the fabric bridge and cause the second data block to be stored in the at least one array.

In an example, the fabric bridge comprises: at least one buffer to store the first data block before receipt of the inject command; and at least one polling register to store information regarding a status of pending read operations from the system memory.

In an example, the apparatus further comprises a first power domain including the power controller and a second power domain including the fabric bridge, where the first power domain is a last power domain to be powered off prior to the entry of the apparatus into the first low power state and the second power domain is a penultimate power domain to be powered off prior to the entry of the apparatus into the first low power state.

In an example, the power controller is to initiate the entry into the first low power state in response to an indication of an idle period that exceeds a latency tolerance value, the latency tolerance value stored in a configuration register.

In an example, the fabric bridge is to: receive, from the power controller, a starting address in the system memory at which a data block is to be stored, a first portion of the data block and a first inject command; and send the first portion of the data block to the system memory for storage at the starting address.

In an example, the fabric bridge is to: receive, from the power controller, a second portion of the data block and a second inject command; increment the starting address to a second address in the system memory at which the second portion of the data block is to be stored; and send the second portion of the data block to the system memory for storage at the second address.

In another example, a method comprises: receiving, in a fabric bridge of an integrated circuit, a save command from a power controller of the integrated circuit via a sideband communication path, the save command including a starting address and an auto increment indicator; receiving, in the fabric bridge, a first data block and storing the first data block in at least one buffer of the fabric bridge, and sending the first data block via a primary communication path to a system memory for storage at the starting address in response to a first inject command from the power controller; receiving, in the fabric bridge, a second data block and storing the second data block in the at least one buffer of the fabric bridge; incrementing the starting address to another address; and sending the second data block via the primary communication path to the system memory for storage at the another address in response to a second inject command from the power controller.

In an example, the method further comprises: determining that an idle period for the integrated circuit exceeds a latency tolerance value stored in a configuration register; and in response thereto, sending the save command from the power controller to the fabric bridge.

In an example, the method further comprises: after a plurality of data blocks have been sent from the fabric bridge to the system memory, causing a first power domain including the fabric bridge to enter into a low power state; and thereafter causing a second power domain including the power controller to enter into the low power state.

In an example, the method further comprises: after presence of the integrated circuit in the low power state for at least a first time duration, causing the second power domain to exit the low power state; and thereafter causing the first power domain including the fabric bridge to exit from the first low power state.

In an example, the method further comprises: receiving, in the fabric bridge, a restore command from the power controller via the sideband communication path, the restore command including the starting address and the auto increment indicator; and receiving, in the fabric bridge, an inject command and in response thereto, sending a data read command to the system memory via the primary communication path, the data read command to request the first data block stored at the starting address.

In an example, the method further comprises: receiving, in the fabric bridge, the first data block via the primary communication path and storing the first data block in a buffer of the fabric bridge; and setting a ready indicator in a status register of the fabric bridge to indicate presence of the first data block in the buffer.

In an example, the method further comprises: receiving, in the fabric bridge, a poll request from the power controller; in response to the poll request, sending a poll response to indicate that the first data block is stored in the buffer, in response to the set ready indicator in the status register; thereafter receiving, in the fabric bridge, a read request from the power controller; and in response to the read request, sending the first data block to the power controller via the sideband communication path.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system includes an SoC that includes: at least one core; a fuse storage to store fuse settings for the SoC; a secure storage to store key information; a power controller, in response to an idle time of the SoC that exceeds a latency tolerance value, to cause the SoC to enter into a first low power state; and a fabric bridge coupled to the power controller, where the power controller is to initiate, prior to entry of the SoC into the first low power state, a save operation in which context state of the SoC is to be stored to a system memory, the context state comprising the fuse settings and the key information, the power controller to send a save command to the fabric bridge to program the fabric bridge with a first address in the system memory at which a first portion of the context state is to be stored, and thereafter the fabric bridge is to receive from the power controller the context state comprising a plurality of data blocks and send each of the plurality of data blocks to the system memory with an address generated in the fabric bridge. The system may further include the system memory coupled to the SoC.

In an example, the power controller is to: initiate a restore operation in which the context state is to be restored from the system memory; and send to the fabric bridge a restore command to program the fabric bridge with the first address in the system memory and a plurality of first commands, where the fabric bridge is to obtain the plurality of data blocks in response to a plurality of read requests each having an address generated in the fabric bridge and send the plurality of data blocks to the power controller.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   at least one processing circuit;
   at least one array associated with the at least one processing circuit;
   a power controller to manage power consumption of the apparatus; and
   a fabric bridge coupled to the power controller, wherein the fabric bridge and the power controller are to implement a handshaking protocol between the fabric bridge and the power controller via a sideband communication path to enable the fabric bridge to receive data from the at least one array via the sideband communication path and send the data to a system memory coupled to the apparatus via a primary communication path, prior to entry of the apparatus into a first low power state.

2. The apparatus of claim 1, wherein the sideband communication path comprises a first sideband router to couple the power controller and the fabric bridge and a second sideband router to couple the at least one array and the fabric bridge.

3. The apparatus of claim 1, wherein the primary communication path comprises a primary fabric to couple the fabric bridge to the system memory via a memory controller.

4. The apparatus of claim 1, wherein the power controller comprises a master to initiate the handshaking protocol with the fabric bridge prior to entry of the apparatus into the first low power state, wherein in the first low power state the apparatus does not retain context.

5. The apparatus of claim 1, wherein the power controller is to:
send at least one command to the fabric bridge including address information to instruct the fabric bridge to send a first data block to the system memory;
send the first data block from the at least one array to the fabric bridge; and
send an inject command to the fabric bridge to cause the fabric bridge to send the first data block via the primary communication path to a first location in the system memory corresponding to the address information.

6. The apparatus of claim 5, wherein, in response to exit of the apparatus from the first low power state, the power controller is to:
send at least one second command to the fabric bridge including second address information to cause the fabric bridge to read a second data block from a second location in the system memory corresponding to the second address information;
send a polling request to the fabric bridge to determine whether the fabric bridge has obtained the second data block;
receive a polling response from the fabric bridge; and
in response to a ready indication of the polling response that indicates that the fabric bridge has obtained the second data block, send a read request to the fabric bridge to receive the second data block from the fabric bridge and cause the second data block to be stored in the at least one array.

7. The apparatus of claim 5, wherein the fabric bridge comprises:
at least one buffer to store the first data block before receipt of the inject command; and
at least one polling register to store information regarding a status of pending read operations from the system memory.

8. The apparatus of claim 1, further comprising a first power domain including the power controller and a second power domain including the fabric bridge, wherein the first power domain is a last power domain to be powered off prior to the entry of the apparatus into the first low power state and the second power domain is a penultimate power domain to be powered off prior to the entry of the apparatus into the first low power state.

9. The apparatus of claim 1, wherein the power controller is to initiate the entry into the first low power state in response to an indication of an idle period that exceeds a latency tolerance value.

10. The apparatus of claim 1, wherein the fabric bridge is to:
receive, from the power controller, a starting address in the system memory at which a data block is to be stored, a first portion of the data block and a first inject command; and
send the first portion of the data block to the system memory for storage at the starting address.

11. The apparatus of claim 10, wherein the fabric bridge is to:
receive, from the power controller, a second portion of the data block and a second inject command;
increment the starting address to a second address in the system memory at which the second portion of the data block is to be stored; and
send the second portion of the data block to the system memory for storage at the second address.

12. At least one non-transitory computer readable storage medium having stored thereon instructions, which if performed by a system cause the system to perform a method comprising:
receiving, in a fabric bridge of an integrated circuit, a save command from a power controller of the integrated circuit via a sideband communication path, the save command including a starting address and an auto increment indicator;
receiving, in the fabric bridge, a first data block and storing the first data block in at least one buffer of the fabric bridge, and sending the first data block via a primary communication path to a system memory for storage at the starting address in response to a first inject command;
receiving, in the fabric bridge, a second data block and storing the second data block in the at least one buffer of the fabric bridge;
incrementing the starting address to another address; and
sending the second data block via the primary communication path to the system memory for storage at the another address in response to a second inject command.

13. The at least one non-transitory computer readable storage medium of claim 12, wherein the method further comprises:
determining that an idle period for the integrated circuit exceeds a latency tolerance value; and
in response thereto, sending the save command from the power controller to the fabric bridge.

14. The at least one non-transitory computer readable storage medium of claim 12, wherein the method further comprises:
after a plurality of data blocks have been sent from the fabric bridge to the system memory, causing a first power domain including the fabric bridge to enter into a low power state; and
thereafter causing a second power domain including the power controller to enter into the low power state.

15. The at least one non-transitory computer readable storage medium of claim 14, wherein the method further comprises:
after presence of the integrated circuit in the low power state for at least a first time duration, causing the second power domain to exit the low power state; and
thereafter causing the first power domain to exit from the first low power state.

16. The at least one non-transitory computer readable storage medium of claim 15, wherein the method further comprises:
receiving, in the fabric bridge, a restore command via the sideband communication path, the restore command including the starting address and the auto increment indicator; and
receiving, in the fabric bridge, an inject command and in response thereto, sending a data read command to the system memory via the primary communication path, the data read command to request the first data block stored at the starting address.

17. The at least one non-transitory computer readable storage medium of claim 16, wherein the method further comprises:
receiving, in the fabric bridge, the first data block via the primary communication path and storing the first data block in a buffer of the fabric bridge; and
setting a ready indicator in a status register of the fabric bridge to indicate presence of the first data block in the buffer.

18. The at least one non-transitory computer readable storage medium of claim 17, wherein the method further comprises:
receiving, in the fabric bridge, a poll request;
in response to the poll request, sending a poll response to indicate that the first data block is stored in the buffer, in response to the set ready indicator in the status register;
thereafter receiving, in the fabric bridge, a read request; and
in response to the read request, sending the first data block to the power controller via the sideband communication path.

19. A system comprising:
a system on chip (SoC) comprising:
at least one core;
a fuse storage to store fuse settings for the SoC;
a secure storage to store key information;
a power controller, in response to an idle time of the SoC that exceeds a latency tolerance value, to cause the SoC to enter into a first low power state; and
a fabric bridge coupled to the power controller, wherein the power controller is to initiate, prior to entry of the SoC into the first low power state, a save operation in which context state of the SoC is to be stored to a system memory, the context state comprising the fuse settings and the key information, the power controller to send a save command to the fabric bridge to program the fabric bridge with a first address in the system memory at which a first portion of the context state is to be stored, and thereafter the fabric bridge is to receive the context state comprising a plurality of data blocks and send each of the plurality of data blocks to the system memory with an address generated in the fabric bridge; and
the system memory coupled to the SoC.

20. The system of claim 19, wherein the power controller is to:
initiate a restore operation in which the context state is to be restored from the system memory; and
send to the fabric bridge a restore command to program the fabric bridge with the first address in the system memory and a plurality of first commands, wherein the fabric bridge is to obtain the plurality of data blocks in response to a plurality of read requests each having an address generated in the fabric bridge and send the plurality of data blocks to the power controller.

* * * * *